(12) United States Patent
Fu et al.

(10) Patent No.: US 8,139,723 B2
(45) Date of Patent: Mar. 20, 2012

(54) VOICE AUTHENTICATION SYSTEM AND METHOD USING A REMOVABLE VOICE ID CARD

(75) Inventors: Guo Kang Fu, Beijing (CN); Feng F Shi, Beijing (CN); Zhi Jun Wang, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1435 days.

(21) Appl. No.: 11/424,627

(22) Filed: Jun. 16, 2006

(65) Prior Publication Data
US 2007/0036289 A1 Feb. 15, 2007

(30) Foreign Application Priority Data
Jul. 27, 2005 (CN) .......................... 2005 1 0087172

(51) Int. Cl.
*H04M 1/64* (2006.01)
(52) U.S. Cl. ................ 379/88.02; 379/114.19; 455/411; 704/275
(58) Field of Classification Search .... 379/88.01–88.04, 379/67.1, 114.19; 704/275, 273; 455/410, 455/411
See application file for complete search history.

(56) References Cited

U.S. PATENT DOCUMENTS

| | | | |
|---|---|---|---|
| 3,896,266 A * | 7/1975 | Waterbury | 379/114.19 |
| 6,078,807 A * | 6/2000 | Dunn et al. | 455/410 |
| 6,272,463 B1 | 8/2001 | Lapere | |
| 6,393,305 B1 | 5/2002 | Ulvinen et al. | |
| 6,556,127 B1 | 4/2003 | Moser et al. | |
| 6,615,171 B1 | 9/2003 | Kanevsky et al. | |
| 6,804,647 B1 | 10/2004 | Heck et al. | |
| 7,016,848 B2 * | 3/2006 | St John Brittan et al. | 704/275 |
| 2003/0048880 A1 * | 3/2003 | Horvath et al. | 379/88.01 |
| 2004/0186724 A1 | 9/2004 | Morin | |
| 2005/0060157 A1 | 3/2005 | Daugherty et al. | |
| 2010/0291901 A1 * | 11/2010 | Geupel | 455/411 |

* cited by examiner

*Primary Examiner* — MD S Elahee
(74) *Attorney, Agent, or Firm* — Robert C. Rolnik; David A. Mims; Herman Rodriguez

(57) ABSTRACT

A voice authentication system using a removable voice ID card comprises: at server side, a voiceprint database for storing the voiceprints of all authorized users; a voiceprint updating means for updating the voiceprints in said voiceprint database; and a voiceprint digest generator for generating a voiceprint digest according to a request from a client; at client side, a voice ID card for storing the voiceprint of an authorized user; a validation means for validating the voiceprint in the voice ID card on the basis of the voiceprint digest from the server; an audio device for performing voice interaction with a user; and a voice authentication means for determining whether the voiceprint from said voice ID card is of the same speaker as the voice from said audio device. The present invention can significantly avoid the abuse of a voice ID card when it is lost or stolen by using the voiceprint digest stored at server side to verify the voiceprint in the voice ID card.

10 Claims, 5 Drawing Sheets

VOICE AUTHENTICATION SYSTEM AND METHOD USING A REMOVABLE VOICE ID CARD

TECHNICAL FIELD

The present invention relates to voice authentication technology in the field of information security, more particularly, to voice authentication system and voice authentication method that store user voice data using a removable storage medium.

TECHNICAL BACKGROUND

Voice authentication technology is widely used in the systems related to information security. Usually, these systems have certain restrictions on accessing users, namely, the accessing users are required to be authenticated when accessing the systems. Along with the emergence of the voice authentication technology, when users make a purchase with a credit card, or access a protected computer system, or retrieve transaction information from the bank, they may have their identities authenticated through their voices, namely, they may have their voices inputted by a microphone or telephone and identified by a voice authentication system to verify whether they are who they claim to be. Moreover, for those users with little computer knowledge, such voice authentication based system is easy to use.

Usually, to carry out the voice authentication, the voice authentication system needs to capture the voice of the speaker, digitize it, and compare it with the stored voice characteristics. Generally, a voice authentication system mainly comprises: a voice input device, such as microphone, telephone, etc; an analog-to-digital converter to digitize the inputted voice; a high-performance computer to perform voice authentication process; and a voice database to store data relative to the voice characteristics of authorized users.

Usually, while carrying out voice authentication, a voice authentication system needs to match the voice harmonic and resonant frequencies of the speaker, as well as the way the speaker pronounces phonemes (a language's smallest distinctive sounds) against the digital voiceprint of an authorized user. The voiceprint is created when the authorized user enrolls in the voice authentication system, and subsequently stored as a digital file in a voice database of the voice authentication system. The voice authentication system calculates a score that indicates how closely the speaker's voice matches the stored voiceprint for the person the speaker claims to be, thereby determining whether the speaker is who he claims to be.

In the implementation of voice authentication technology, although using chips can quickly process the large amount of information involved in voice authentication, at present a general method is to leverage a portable software system to implement voice authentication functionality.

Conventional voice authentication systems are always based on client-server architecture, which requires huge storage and powerful processors to store data and perform pattern-matching technologies, to compare live speech with stored voiceprints of authorized users on server side. Furthermore, the information of voice templates is usually much larger than other kinds of biometric information. This makes fast servers and quick filtering software a must. At the same time, this makes the time required to authenticate a user very long. So there arises the need to implement voice authentication functionality on client side with limited resources. If a voice authentication system adopts the voice authentication on client side, voice data, such as voiceprint, may be stored in a removable storage medium called voice ID card, such as that based on a smart card. When a user is required to be authenticated, a voice ID card is provided to the authentication system by the user, and the client matches the user's voice to the voice data stored in the voice ID card, thereby implementing the voice authentication. To inspire confidence and encourage more widespread adoption, however, the above-mentioned voice authentication system using removable storage media must overcome several obstacles as below.

Firstly, the security problem of the voice ID card. The biggest problem of storing voice data, such as the voiceprints of a authorized user, in a removable storage medium is the security of the removable storage medium itself, as it is prone to be lost, stolen, and abused.

Secondly, the problem of data-hacking prevention. As systems adopting voice authentication technology all relate to confidential information, and technologies that allow access to confidential systems have come forth at present, there are concerns about whether hackers could compromise voice authentication systems. For example, it is possible to cheat an ordinary voice authentication system of authentication by playing a recording of someone's voice. Nowadays, many sophisticated systems create detailed voiceprint information that would not match readily with a recorded voice. Voices generated by some high-precision voice imitators, though, could still fool a pure voice authentication system in many cases.

Thirdly, the problem of consistent accuracy. Voice authentication is the least accurate biometric-security system. In real-world use, users' behavioral and environmental factors such as background noises or changes in users' voices due to health, emotional state, fatigue, age, or other causes might reduce the accuracy of voice authentication systems. This makes a system relying on voice authentication alone as a security measure problematic. To solve this problem, researchers are taking several approaches to improve the accuracy of voice authentication. In an environment like a home with a low-end microphone and limited system resources instead of a lab environment, however, it is difficult to apply a sophisticated voice authentication system.

SUMMARY OF THE INVENTION

The present invention is presented in regard to the above-mentioned technical problems. Its objective is to provide a voice authentication system and voice authentication method using a removable voice ID card, wherein even if the removable storage medium storing the voiceprint of the authorized user is lost or stolen, the abuse of the voiceprint can be prevented.

According to an aspect of the present invention, a voice authentication system using a removable voice ID card is provided, comprising:

at server side, a voiceprint database for storing voiceprints of all authorized users;

a voiceprint updating means for updating voiceprints in said voiceprint database; and a voiceprint digest generator for generating a voiceprint digest according to a request from a client;

at client side, a voice ID card for storing the voiceprint of an authorized user;

a validation means for validating the voiceprint in the voice ID card on the basis of the voiceprint digest from the server;

an audio device for performing voice interaction with users;

a voice authentication means for determining whether the voiceprint from said voice ID card is of the same speaker as the voice from said audio device;

Preferably, at client side, said voice authentication system further comprises:

a random pass code generator for randomly generating a text script as a pass code;

a text-to-speech converting means for generating audio data according to the text script and sending it to said audio device; and a voice recognition means for recognizing the semantic meaning of the voice inputted by the user through said audio device, and judging whether it is the same as the text script generated by said random pass code generator, thereby determining whether said user can be authorized.

Preferably, said voiceprint database includes voiceprint digests corresponding to the respective voiceprints; and said voiceprint digest generator is used to retrieve the corresponding voiceprint digest from said voiceprint database according to a request from a client.

Preferably, said digest generator generates in real time the requested voiceprint digest according to a request from a client.

Preferably, at client side, said voice authentication means further comprises:

a timer for recording the period from a user being informed to input voice to the voice being inputted.

Preferably, at client side, said voice authentication means further comprises:

a counter for recording the times of failure of authentication.

According to another aspect of the present invention, there is provided a voice authentication method using a removable voice ID card, the method comprising the following steps:

a user inserting the voice ID card storing the voiceprint of the authorized user therein into the client;

the client requesting from the server the voiceprint digest that is corresponding to the voiceprint in the voice ID card;

the client generating the digest of the voiceprint in the voice ID card;

comparing the two above-mentioned voiceprint digests; and in case that the two digests match, performing the voice authentication process; otherwise, rejecting the user's request.

Preferably, said step of performing the voice authentication process further comprises:

the client randomly generating a pass code, converting it to voice, and playing it to the user;

the user repeating the above-mentioned voice;

the client recognizing the semantic meaning of the voice inputted by user through the audio device, and judging whether it is the same as the text script corresponding to said pass code, thereby determining whether said user can be authorized.

Preferably, said authentication method further comprises the step of updating voiceprints of authorized users stored in the server.

Preferably, said step of performing the voice authentication process further comprises:

informing the user to input voice and starting timing simultaneously;

denoting authentication failure if the user does not input voice in a pre-determined period.

Preferably, said step of performing the voice authentication process further comprises:

prompting the user to input voice again when the authentication fails;

recording the times of failure of authentication; and rejecting the user's request when said times of failure exceeds a pre-determined value and ending the authentication.

According to still another aspect of the present invention, a voice authentication system using a removable voice ID card is provided, the system comprising:

a voice ID card for storing the voiceprint of an authorized user;

an audio device for performing voice interaction with a user;

a voice authentication means for determining whether the voiceprint from said voice ID card is of the same speaker as the voice from said audio device;

a random pass code generator for randomly generating a text scripts as a pass code;

a text-to-speech converting means for generating audio data according to the text script and sending it to said audio device;

a voice recognition means for recognizing the semantic meaning of the voice inputted by the user through said audio device, and judging whether it is the same as the text script generated by said random pass code generator, thereby determining whether said user can be authorized.

In the voice authentication system and method using a removable voice ID card according to the present invention, by utilizing the voiceprint digest in the server to verify the voiceprint in the voice ID card, it is possible to effectively prevent the abuse of the voice ID card when it is lost or stolen, as well as keep the advantages of existing client based voice authentication systems. By applying the present invention, it is also possible to update the voiceprint in the server when the voice ID card is lost and stolen, in order to invalidate the old voiceprint. Moreover, in the present invention, by utilizing the text-to-speech system to generate a random voice pass code, it is possible to authenticate the user's voice in both acoustics and semantics, thereby avoiding being cheated of authentication by a recording, as well as improving the reliability of the simple acoustics based voice authentication systems.

DETAILED DESCRIPTION OF THE INVENTION

It is believed that the above-mentioned and other objectives, features, and advantages of the present invention will become more apparent by referring to the following detailed description of the particular embodiments of the present invention in conjunction with the accompanying drawings.

Figure 1:
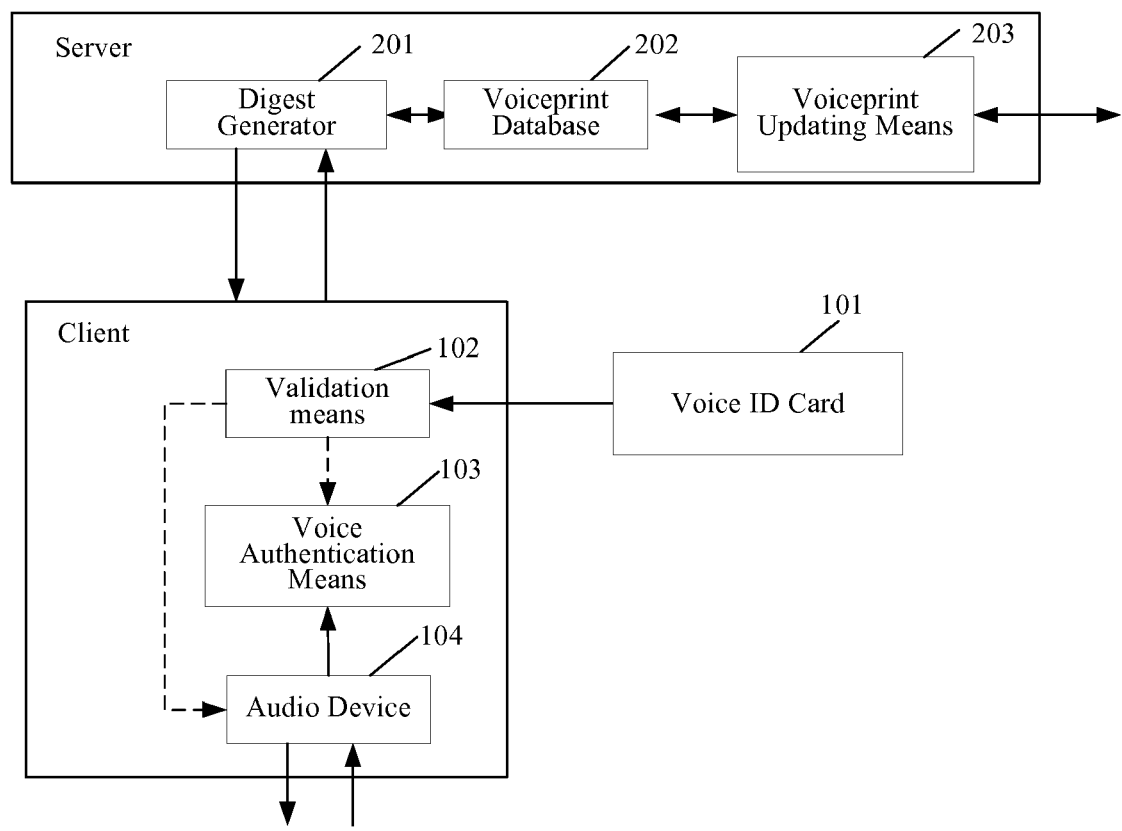
FIG. 1 is a block diagram of a voice authentication system according to an embodiment of the present invention.

FIG. 1 is a block diagram of a voice authentication system according to an embodiment of the present invention.

As shown in the FIG. 1, the voice authentication system, at server side, comprises: a voiceprint database 202, which stores voiceprints of all authorized users; a voiceprint digest generator 201 for generating the voiceprint digest (information for characterizing the voiceprint characteristics) according to a request from a client, in order to verify the voiceprint in the voice ID card 101; and a voiceprint updating means 203 for updating the voiceprints in the voiceprint database 201 regularly or when a voice ID card is lost or stolen. Preferably, the voiceprint database 202 further includes the voiceprint digests corresponding to the respective voiceprints, and the voiceprint digest generator 201, when receiving a request from a client, retrieves the corresponding voiceprint digest in the voiceprint database 202 and sends it to the client. Furthermore, the digest generator 201 may also generate in real time the requested voiceprint digest according to a request from a client, and send the real-time generated voiceprint digest to the client.

The voice authentication system, at client side, comprises: a voice ID card 101, which stores the voiceprint of an authorized user and may be implemented using a smart card based removable medium; a audio device 104, through which a user inputs voice to the voice authentication system as the object to be authenticated and through which the voice authentication system plays a voice prompt to the user, for instance, informing the user to input voice, a validation means 102 for validating the voiceprint in the voice ID card 101 on the basis of the voiceprint digest from the voiceprint digest generator 201, and then sending the validation result to the audio device 104 and the voice authentication means 103, to control the operations of the audio device 104 and the voice authentication means 103; a voice authentication means 103, which, when the validation result from the validation means 102 is positive, determines whether the voiceprint from the voice ID card 101 is of the same speaker as the voice inputted from the audio device 104, namely, determines whether the user inputting voice to the system is the same as the provider of the voiceprint in the voice ID card 101.

The operation process of the voice authentication system as shown in FIG. 1 is described as below. A user first inserts a voice ID card 101 containing the voiceprint of the authorized user into the client, and the voiceprint in the Card 101 is sent to the validation means 102. The validation means 102 establishes a connection with the server and sends a voiceprint validation request containing the ID information of the requested voiceprint to the voiceprint digest generator 201 at server side. The voiceprint digest generator 201 searches for the corresponding voiceprint digest according to the ID information or generates in real time the voiceprint digest according to the voiceprint in the voiceprint database 202, and then sends the voiceprint digest back to the validation means 102. In the meantime, the validation means 102 generates the digest of the voiceprint in the voice ID card 101, and compares it with the voiceprint digest returned from the server, and then sends a control signal to the audio device 104 and the voice authentication means 103.

If the comparison result is negative, namely, the two digests are not identical, then a "reject" control signal is sent so as to prevent the user from accessing any service and application and the authentication fails.

If the comparison result is positive, namely, the voiceprint digest in the voice ID card 101 is identical with that obtained from the server, then a "success" control signal is sent. After receiving the signal, the audio device 104 plays a voice prompt to the user, to inform the user to input voice. In this case, the voice prompt to be played is recorded in advance. In the mean time, after receiving the "success" control signal, the voice authentication means 103 informs the user to input voice through the audio device 104, which voice is sent to the voice authentication means 103. The voice authentication means 103 receives the voice input from the audio device 104, determines whether the voice is of the same speaker as the voiceprint obtained from the voice ID card 101, and produces an determination result. If the determination result is positive, it denotes that the authentication succeeds, the identity of user inputting the voice is verified, and the user can proceed with the subsequent access; if the determination result is negative, it denotes that the authentication fails, and the access request of the user is rejected.

In case of the voice ID card 101 being lost or stolen, the user may retrieve the old voiceprint from the voiceprint database 202, modify it and store it again into the voiceprint database 202, or directly replace the old voiceprint with the new one by using the voiceprint updating means 203. New voiceprint may also be downloaded into a new voice ID card 101.

From the above description, it can be seen that the system adopting the present embodiment, by using the voiceprint stored in server to validate the voiceprint in the voice ID card, can prevent the voice ID card from being abused when it is lost or stolen. In particular, in the system of the present embodiment, when the voice ID card is lost or stolen, it is possible to update the voiceprint of the authorized user through the voiceprint updating means, thereby preventing the lost voice ID card from being embezzled or abused.

Figure 2:
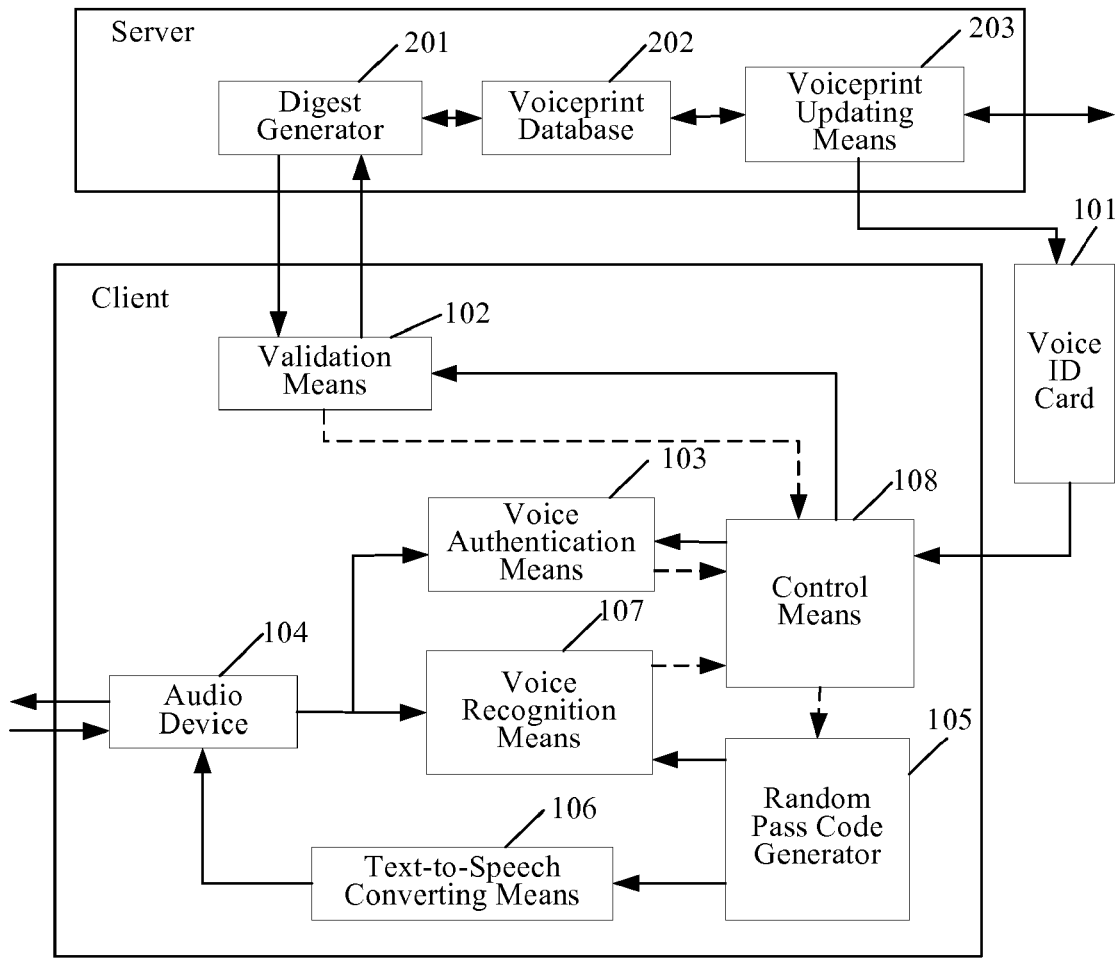
FIG. 2 is a block diagram of a voice authentication system according to another embodiment of the present invention.

FIG. 2 is a block diagram of a voice authentication system according to another embodiment of the present invention, wherein the same components as those in the embodiment shown in FIG. 1 are marked with the same numerals and the corresponding descriptions are omitted appropriately.

As shown in FIG. 2, besides the voiceprint digest generator 201, voiceprint database 202, and voiceprint updating means 203 at server side, as well as the voice ID card 101, audio device 104, voice authentication means 103, and validation means 102 at client side, the voice authentication system, at client side, further comprises, a random pass code generator 105, a text-to-speech converting means 106, a voice recognition means 107, and a control means 108. Among them, the random pass code generator 105 randomly generates a text script for acoustic and semantic verification of a user's voice and sends it to the text-to-speech converting means 106 under the control of the control means 108; the text-to-speech converting means 106 generates audio data based on the received text script and sends it to the audio device 104 to be played to the user; the voice recognition means 107 recognizes the semantic meaning of the voice inputted by the user through the audio device 104, and judges whether the recognition result is the same as the text script generated by the random pass code generator 105; the control means 108 is used to control the random pass code generator 105, and receive the determination result of the voice authentication means 103 and the judgment result of the voice recognition means 107, to determine whether said user can be authenticated. In the present embodiment, the output of the validation means 102 is connected to the control means 108, and the control means 108 controls the random pass code generator 105 on the basis of the validation result of the validation means 102.

The operation process of the system shown in FIG. 2 is described as below, wherein the descriptions of the same components as those in the operation process of the system shown in FIG. 1 are omitted.

In case of the validation result of the validation means 102 being negative, a "reject" control signal is then sent to the control means 108, the authentication fails, and the user's access request is rejected.

In case of the validation result of the validation means 102 being positive, a "success" control signal is then sent to the control means 108. After receiving the control signal, the control means 108 controls the random pass code generator 105 to generate a random text script and sends it out to the text-to-speech converting means 106. The text-to-speech converting means 106 converts the text script to voice data and sends it out to the audio device 104. The audio device 104 plays the voice to the user and requests the user to repeat the voice as an input. After inputted by the user, the voice is transferred to the voice authentication means 103 and the voice recognition means 107 respectively. The voice authentication in the voice authentication means 103 is the same as that in the system shown in FIG. 1 and the description thereof is omitted here. The authentication result is sent to the control means 108. Meanwhile, the voice recognition means 107 recognizes the semantic meaning of the voice inputted by the user. To improve the recognition result, the pass code generated by the random pass code generator 105 is also sent to the voice recognition means 107 at the same time, to generate the corresponding recognition grammar. Then the voice recognition means 107 compares the recognized pass code with the original one, judging whether they are the same, and sends the judgment result to the control means 108. After the control means 108 receives the authentication result from the voice authentication means and the recognition result from the voice recognition means, if both of the two results are positive, the authentication succeeds and the user can proceed with the subsequent access; if either of them is negative, the authentication fails and the user's request is rejected.

From the above description, it can be known that the system adopting the present embodiment further authenticates the user's voice in both acoustics and semantics simultaneously, improving the accuracy of the voice authentication system; and by means of randomly generating a text script, it also effectively prevents being cheated of authentication by playing a recording.

In addition, the voice authentication system may further comprise a timer for recording the period from a user being informed to input voice to the voice being inputted. When the audio device 104 begins to play voice, the timer starts up; when the audio device 104 receives the voice inputted by the user, the timer stops. A threshold value is set in the timer. When the threshold value is exceeded, denoting that the user has not inputted voice in the pre-determined period, a signal is sent to the control means 108. The control means 108 determines that the authentication fails and rejects the user's access request; or it controls the audio device 104 to play voice to the user once again.

If the control means 108 controls the audio device 104 to play voice to the user once again, the voice authentication system may further comprise a counter for recording the times of failure of authentication according to the control of the control means 108. A threshold value is also set in the counter When the threshold value is exceeded, a signal is sent to the control means 108. The control means 108 determines that the authentication fails and rejects the user's access request.

Figure 3:
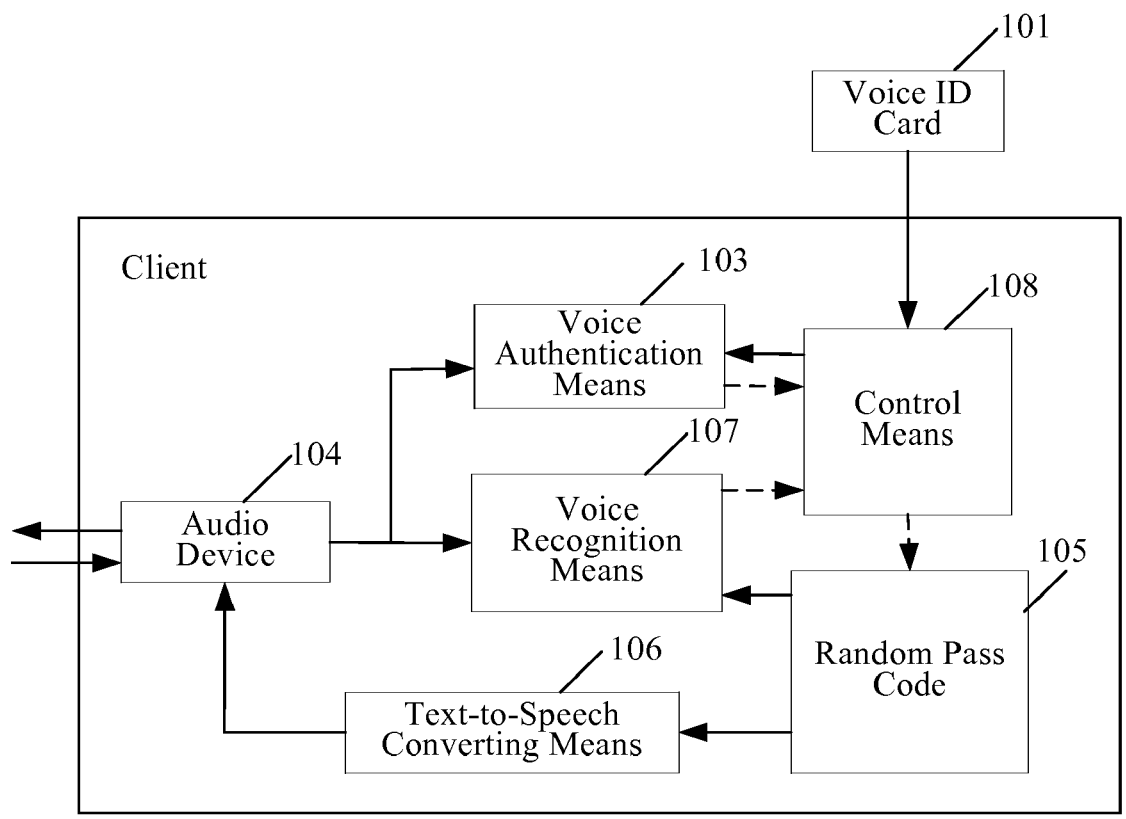
FIG. 3 is a block diagram of a voice authentication system according to still another embodiment of the present invention.

FIG. 3 is a block diagram of a voice authentication system according to still another embodiment of the present invention, wherein the same components as those shown in the embodiments in FIG. 1 or FIG. 2 are marked with the same numerals and the corresponding descriptions are omitted appropriately.

As shown in FIG. 3, the voice authentication system comprises: a voice ID card 101, a audio device 104, a voice authentication means 103, a random pass code generator 105, a text-to-speech converting means 106, a voice recognition means 107, and a control means 108.

The operation process of the voice authentication system shown in FIG. 3 is described as below. When a user intends to access a certain system or application with voice authentication functionality, the voice authentication system is required to authenticate the user's identity. Firstly, the user inserts a voice ID card 101 with the voiceprint of the authorized user into the client so that the voiceprint in the Card 101 is transferred to the voice authentication means 103. In the mean time, the control means 108 controls the random pass code generator 105 to generate a random text script as a pass codes and sends it out to the text-to-speech converting means 106. The text-to-speech converting means 106 converts the text script to voice data and sends it out to the audio device 104. The audio device 104 plays the voice to the user and requires the user to repeat the voice as an input. After inputted by the user, the voice is transferred to the voice authentication means 103 and the voice recognition means 107 respectively. The voice authentication means 103 receives the voice inputted from the audio device 104, determines whether the voice is of the same speaker as the voiceprint received from the voice ID card 101, generates an determination result, and sends it to the control means 108. In the mean time, the voice recognition means 107 recognizes the semantic meaning of the voice inputted by the user. To improve the recognition result, the pass code generated by the random pass code generator 105 is sent to the voice recognition means 107 as well, in order to generate the corresponding recognition grammar. Then the voice recognition means 107 compares the recognized pass code with the original one, judges whether they are the same, and sends the judgment result to the control means 108. After the control means 108 receives the authentication result of the voice authentication means and the recognition result of the voice recognition means, if both of the two results are positive, the authentication succeeds and the user can proceed with the subsequent access; if either of them is negative, the authentication fails and the user's request is rejected.

From the above description, it can be known that the system adopting the present embodiment can authenticate a user's voice in both acoustics and semantics simultaneously, improving the accuracy of the voice authentication system; and by means of randomly generating a text script, it also effectively prevents being cheated of authentication by playing a recording.

Figure 4:
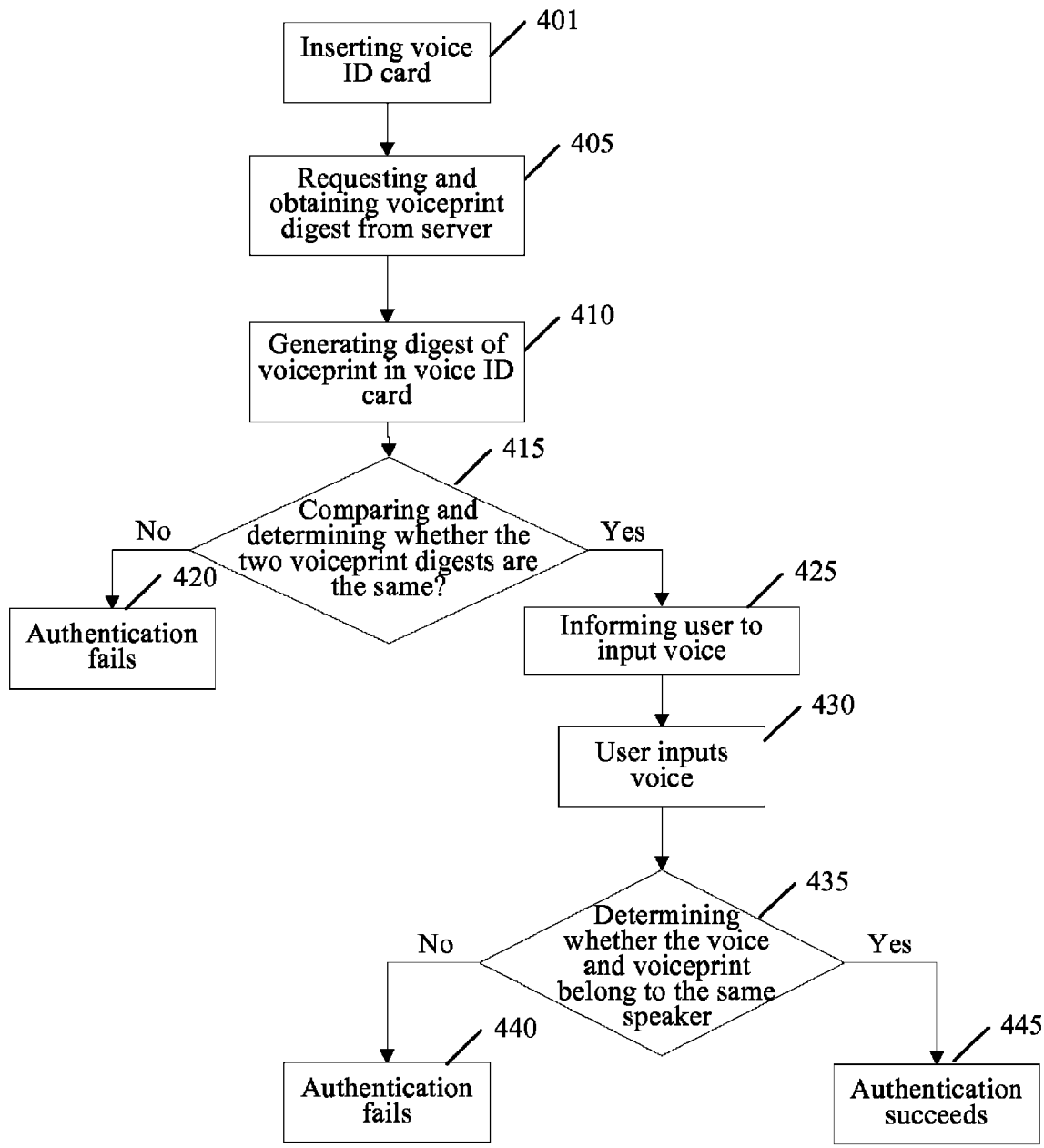
FIG. 4 is a flow chart of a voice authentication method according to an embodiment of the present invention.

FIG. 4 is a flow chart of a voice authentication method according to an embodiment of the present invention. As shown in FIG. 4, when a user accesses a system with voice authentication functionality, it is required to authenticate the user's identity. Firstly at Step 401, the user inserts a voice ID card storing the voiceprint of the authorized user into the client. Then at Step 405, the client sends to the server a request which contains the ID information of the voiceprint in the voice ID card, to obtain the voiceprint digest of the authorized user in the server. The server retrieves the stored voiceprint digest or generates in real time the digest of the voiceprint based on the ID information and sends it back to the client. At Step 410, the client generates the digest of the voiceprint in the voice ID card. Then at Step 415, the client compares the voiceprint digest received from the server with the digest of the voiceprint in the voice ID card. In case of the two voiceprint digests being the same, the user is informed to input voice (Step 425); otherwise, the authentication fails and the user's access request is rejected (Step 420). At Step 430, the user inputs voice into the client, which determines whether the voice is of the same speaker as the voiceprint from the voice ID card (Step 435). If the above-mentioned determination result is positive, this authentication succeeds and ends (Step 445); otherwise, the authentication fails and the user's access request is rejected (Step 440).

It can be seen from the above description that the voice authentication method adopting the present embodiment can prevent the abuse of the voice ID card when it is lost or stolen by verifying the voiceprint in the voice ID card prior to the formal authentication.

Figure 5:
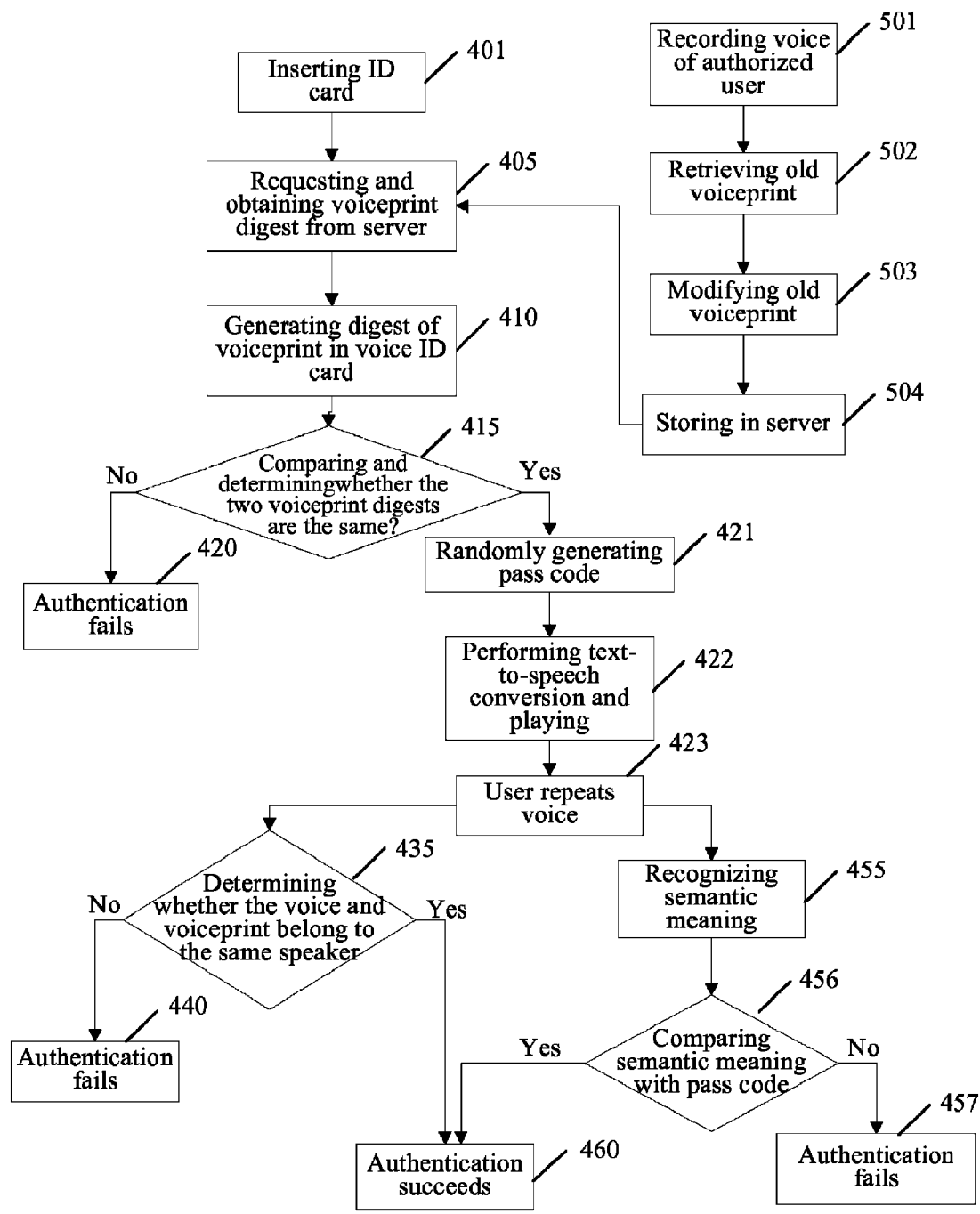
FIG. 5 is a flow chart of a voice authentication method according to another embodiment of the present invention.

FIG. 5 is a flow chart of a voice authentication method according to another embodiment of the present invention, wherein the same steps as those shown in the embodiment in FIG. 4 are marked with the same numerals and the corresponding descriptions are omitted appropriately.

As shown in FIG. 5, firstly Step 401 to Step 415 are carried out. These steps are the same as those in FIG. 4 and the corresponding descriptions are omitted here. In case of the voiceprint digest received from the server being the same as the digest of the voiceprint in the voice ID card, the client randomly generates a text script for validating semantic meanings as a pass code (Step 421). At Step 422, the text script is converted to voice data and played to the user. Then the user repeats the above-mentioned voice at Step 423, to input voice to the client. After the user inputs voice, at the same time when Step 435 is carried out, the client recognizes the semantic meaning from the voice (Step 455), and compares the recognized semantic meaning with the randomly generated pass code (Step 456). If the comparison result is that they are the same, and the determination result at Step 435 is also positive, it denotes that the authentication of the user succeeds and the user is allowed to proceed with the subsequent access (Step 460). If either the comparison result at Step 456 or the determination result at Step 435 is negative, the authentication fails and the user's access request is rejected (Step 457).

In addition, the voice authentication method of the present embodiment further comprises: at the same time when Step 422 is being carried out, starting timing until the user inputs voice. If the user has not inputted voice in a pre-determined period, it denotes that the authentication fails and the user's access request is rejected.

In addition, the voice authentication method of the present embodiment, in case of the authentication failing, may further comprise: prompting the user to input voice once again and recording the times of failure of authentication. If the times of failure exceeds a pre-determined value, the user's request is rejected and this authentication ends.

In addition, it may further comprise the step of updating the voiceprint stored in the server, the details of which are: at Step 501, recording several segments of voice of the authorized user; then at Step 502, retrieving the old voiceprint of the authorized user from the server on the basis of the information of the authorized user; and then modifying the old voiceprint according to the newly recorded voice (Step 503); replacing the old voiceprint with the modified new one and storing it in the server (Step 504). The new voiceprint may also be downloaded to a new voice ID card.

It can be seen from the above description that the method adopting the present embodiment authenticates the voice inputted by user in both acoustics and semantics, improving the accuracy of the voice authentication, and effectively prevents being cheated of authentication by playing a recording by means of randomly generating a pass code. Moreover, the present embodiment allows updating the voiceprint stored in the server, therefore effectively avoiding the abuse of the voice ID card when it is lost or stolen.

The invention claimed is:

1. A voice authentication system using a removable voice ID card, comprising:
   a voiceprint database of a server for storing voiceprints of all authorized users;
   a voiceprint updating means of the server for updating each voiceprint of the voiceprints, wherein each voiceprint is updated in said voiceprint database;
   a voiceprint digest generator of the server for generating a first voiceprint digest according to a request from a client;
   a means for generating a second voiceprint digest in the voice ID card of the client;
   the voice ID card for storing a voiceprint of an authorized user;
   a validation means of the client for validating the voiceprint in the voice ID card on the basis of the first voiceprint digest from the server;
   an audio device of the client for performing voice interaction with the authorized user; and
   a voice authentication means of the client for determining whether the voiceprint from said voice ID card belongs to the authorized user after matching the first voiceprint digest with the second voiceprint digest.

2. The voice authentication system according to claim 1, wherein, said voice authentication system, at client side, further comprises:
   a random pass code generator for randomly generating a text script as a pass code;
   a text-to-speech converting means for generating audio data based on the text script and sending it to said audio device;
   a voice recognition means for recognizing a semantic meaning of the voice inputted by the user through said audio device, and
   judging whether it is the same as the text script generated by said random pass code generator, thereby determining whether said user can be authorized.

3. The voice authentication system according to claim 1 wherein, said voiceprint database includes the voiceprint digests corresponding to the respective voiceprints; and said voiceprint digest generator is used to retrieve the corresponding voiceprint digest from said voiceprint database according to the request from the client.

4. The voice authentication system according to claim 1 wherein, said digest generator generates in real time the requested voiceprint digest according to the request from the client.

5. The voice authentication system according to claim 1 wherein, said voice authentication system, at client side, further comprises:
   a timer for recording the period from the user being informed to input voice to the voice being inputted.

6. The voice authentication system according to claim 5, wherein, said voice authentication system, at client side, further comprises: a counter for recording the times of failure of authentication.

7. A voice authentication method using a removable voice ID card, comprising the following steps:
   a user inserting the voice ID card storing a voiceprint of an authorized user into a client;
   the client requesting from the server a first voiceprint digest corresponding to the voiceprint in the voice ID card;

the client generating a second voiceprint digest in the voice ID card;
authenticating the user by the client by comparing the first voiceprint digest with the second voiceprint digest, wherein the user is authenticated if the first voiceprint digest matches the second voiceprint digest; and
updating the voiceprint of the authorized user in the server.

8. The voice authentication method according to claim 7, wherein, authenticating further comprises:
the client randomly generating a pass code, converting it to voice, and playing it to the user;
the user repeating said voice;
the client recognizing a semantic meaning of the voice inputted by the user through the audio device, and judging whether it is the same as the text script corresponding to said pass code, thereby determining whether said user can be authorized.

9. The voice authentication method according to claim 7 wherein, said voice authentication method further comprises:
starting timing at the same time of performing the step of informing the user to input voice; and
denoting that the authentication fails if the user has not input voice in a pre-determined period.

10. The voice authentication method according to claim 9, wherein, said voice authentication method further comprises:
prompting the user to input voice once again when the authentication fails;
recording the times of failure of authentication; and
rejecting the user's request and this authentication ending when said times of failure exceeds a pre-determined value.

* * * * *